Aug. 17, 1965 J. CHERNIAVSKYJ ETAL 3,201,020
SELF-THREADING MOTION PICTURE PROJECTOR
Filed Jan. 25, 1963 8 Sheets-Sheet 6

Inventors:
Jaroslav Cherniavskyj
Bruno Michaels
Arthur E. Nupnau
John R. Nasiatka
By
Hill, Sherman, Meroni, Gross & Simpson
Attys.

Aug. 17, 1965    J. CHERNIAVSKYJ ETAL    3,201,020
SELF-THREADING MOTION PICTURE PROJECTOR
Filed Jan. 25, 1963    8 Sheets-Sheet 7

Inventors:
Jaroslav Cherniavskyj
Bruno Michaels
Arthur E. Nupnau
John R. Nasiatka
By
Hill, Sherman, Meroni, Gross & Simpson
Attys.

United States Patent Office 3,201,020
Patented Aug. 17, 1965

3,201,020
SELF-THREADING MOTION PICTURE PROJECTOR
Jaroslav Cherniavskyj, Skokie, Bruno Michaels and Arthur E. Nupnau, Chicago, and John R. Nasiatka, Norridge, Ill., assignors to Bell & Howell Corporation, Chicago, Ill., a corporation of Illinois
Filed Jan. 25, 1963, Ser. No. 253,969
16 Claims. (Cl. 226—91)

This invention relates to improvements in a self-threading motion picture projector, and more particularly to a motion picture projector, silent or with sound, equipped with means for the rapid, automatic, and precise threading of the film over the feed sprockets, through the gate assembly, and over the sound drum if one is present, without injury to any portion of the film including the film leader.

This invention is an improvement upon the invention disclosed, described and claimed in a Bruno Michaels co-pending application entitled "Automatic Film Threading Device," filed December 29, 1958, Serial No. 783,248, now Patent No. 3,122,965 assigned to the same assignee as the present application.

Heretofore, there have been numerous attempts to provide a motion picture projector that was automatically self-threading and capable of handling film over 8 mm. in size. All these previous attempts failed to produce a commercially practical, acceptable, or satisfactory self-threading projector capable of handling 16 mm. film. It was not until the advent of the instant invention that not only was there a commercially acceptable and satisfactory, but a commercially successful self-threading projector, and particularly a sound projector, that was capable of accurately self-threading a 16 mm. film without damage to the film.

It is obviously desirable to have a precise self-threading projector for 16 mm. film not only for entertainment purposes, lectures, and the like, but particularly for industrial purposes such as sales films, training films, and the like so that the particular presentation may begin at exactly the proper moment for best effect and carried on without film-flutter or off-key sound. Heretofore, fumbling hand threading operations which were distracting, and resulted in time wasting delays, frequently lost the attention of the audience to an extent where it could never be regained and thereby ruined the effectiveness of the presentation.

Previous attempts at providing a complete or partial self threading assembly have not been entirely successful. Mechanisms have been known to employ the shuttle teeth in the film threading operation but in such devices a problem arises as to how to insure that the shuttle teeth will find the film apertures to effect intermittent feed. Likewise, projectors have been devised in which shuttle-tooth operation is halted during the threading operation. However, in such mechanisms a problem was encountered in feeding the film through the gate during the threading operation in some instances because there was no assurance that the shuttle teeth would be in a retracted position during the threading operation, and the pressure plate would be urging the film against the track plate and the shuttle teeth if they projected into the gate passage. Many such previous mechanisms also failed to thread a film, that might be damaged to some extent prior to use, and they failed to insure prompt and proper engagement with the film by the shuttle teeth when the mechanism was switched from self-threading to normal running operation. That was because there was no way to insure that the shuttle teeth which do not engage the film during the self-threading operation were in position to properly enter apertures in the film. Another feature that contributed to the objectionable character of these heretofore known self-threading attempts was the fact that frequently the film was not properly engaged with the teeth on the feeding sprockets in time to properly complete a self-threading operation without the film travelling in an improper direction and probably jamming. But perhaps the prime objection to previous attempts to provide a self-threading projector was the fact that not one was ever produced that provided a free, unimpeded and entirely unobstructed film path through the gate assembly during the threading operation.

The entire elimination of the above noted objections inter alia is a prime desideratum of the instant invention.

Another important object of the instant invention is the provision of a projector equipped with self-threading mechanism, usable in different sizes for either 8 mm. or 16 mm. film, in which the shuttle is retracted and held in position with the shuttle teeth out of the path of the film travelling through the gate assembly.

It is also an important object of this invention to provide a self-threading motion picture projector with shuttle retracting means for the threading operation, and also with means to insure prompt shuttle engagement with the film apertures upon change from self-threading operation to normal running operation.

A further feature of this invention embodies the provision of a self-threading motion picture projector in which the shuttle is automatically retracted and held with the shuttle teeth out of the path of film travelling through the gate assembly upon switching from running position to self-threading position.

Still another desideratum of the invention is the provision of a self-threading motion picture projector embodying shuttle retracting means during self-threading of the film, and which is equipped with means to automatically insure proper engagement of the shuttle teeth with the apertures in the film almost immediately upon switching of the mechanism from self-threading position to normal running position.

Still another object of this invention is the provision of a self-threading motion picture projector in which the shuttle is retracted during the self-threading operation, and which is equipped with a loop restorer which automatically and rapidly cooperates with the shuttle upon switching to normal running position to insure proper engagement of the shuttle teeth with the film apertures.

Another important desideratum of the instant invention is the provision of a self-threading motion picture projector in which the pressure or aperture plate is automatically retracted and held when the mechanism is switched to self-threading position.

Also a feature of the invention is the automatic retraction of the shuttle from the film path through the gate assembly along with the retraction of the pressure plate in the opposite direction, whereby the film path through the gate assembly is completely free and unimpeded during the self-threading operation.

It is still a further object of this invention to provide a self-threading motion picture projector equipped with means to assure accurate and immediate self-threading with proper engagement of the film with the teeth of the film feeding sprockets.

This invention also provides yieldable sprocket guide shoes which will respond to relatively light film pressure in case of jamming and move away from the sprocket whereby the film is not damaged by the sprocket teeth.

Still another feature of this invention resides in the provision of a motion picture projector having a pivotal arm for the take-up reel movable from operating position to storage position, and when in storage position the arm is disposed over the snubbing roll so that film cannot be threaded over the snubbing roll until the arm is in take-up reel supporting position.

A further feature of the instant invention is the provision in a projector of the character described of simple manually operable means to quickly restore a lost film loop when the film is travelling in the reverse direction.

While some of the more salient features, characteristics and advantages of the instant invention have been above pointed out, others will become apparent from the following disclosures, taken in conjunction with the accompanying drawings, in which.

As shown on the drawings.

The instant invention is primarily associated with the rapid, precise, and easy threading of a film through its prescribed path of travel in a projector, without any injury occurring to the film, and accomplishing the same result even though the film may have previously been mutilated to some extent. Resiliently biased sprocket guide shoes are provided to insure prompt and accurate engagement of the drive sprocket teeth in the film apertures. The combined guide and loop forming means above and below the gate assembly may be quickly adjusted between threading and normal running position, and when switched from normal running position to threading position, the toothed shuttle which intermittently feeds the film through the gate assembly is automatically retracted from the gate assembly permitting the film to pass freely and easily along the path through the gate assembly without any contact with the shuttle teeth. At the same time, the aperture or pressure plate is retracted forwardly leaving the film passage through the gate assembly completely free and unimpeded. There is, therefore, no danger whatever of the film being scratched, torn, or otherwise mutilated by the shuttle teeth during the threading operation.

When the threading operation has been completed, the guide and loop forming means are switched back to normal running position, and in so doing both the pressure plate and the shuttle are automatically released and the shuttle permitted to enter the gate assembly, but the shuttle may be in such position upon re-entry into the gate assembly that the teeth contact the film between adjacent apertures rather than properly enter the film apertures. Such circumstance is promptly corrected by an automatic loop restorer cooperating with the shuttle and quickly advancing the film in short increments so that almost immediately the shuttle teeth are properly engaged in the film apertures. Allowing the film to have a free and unimpeded path through the gate assembly during the threading operation also augments the accuracy with which the film may be threaded over the upper drive sprocket, over the lower drive sprocket, over a sound drum, and engaged with the teeth on the underside of the lower drive sprocket quickly and accurately. With the instant invention, the film may be threaded through the projector, and the presentation of the film started in approximately ten seconds.

Figure 1:
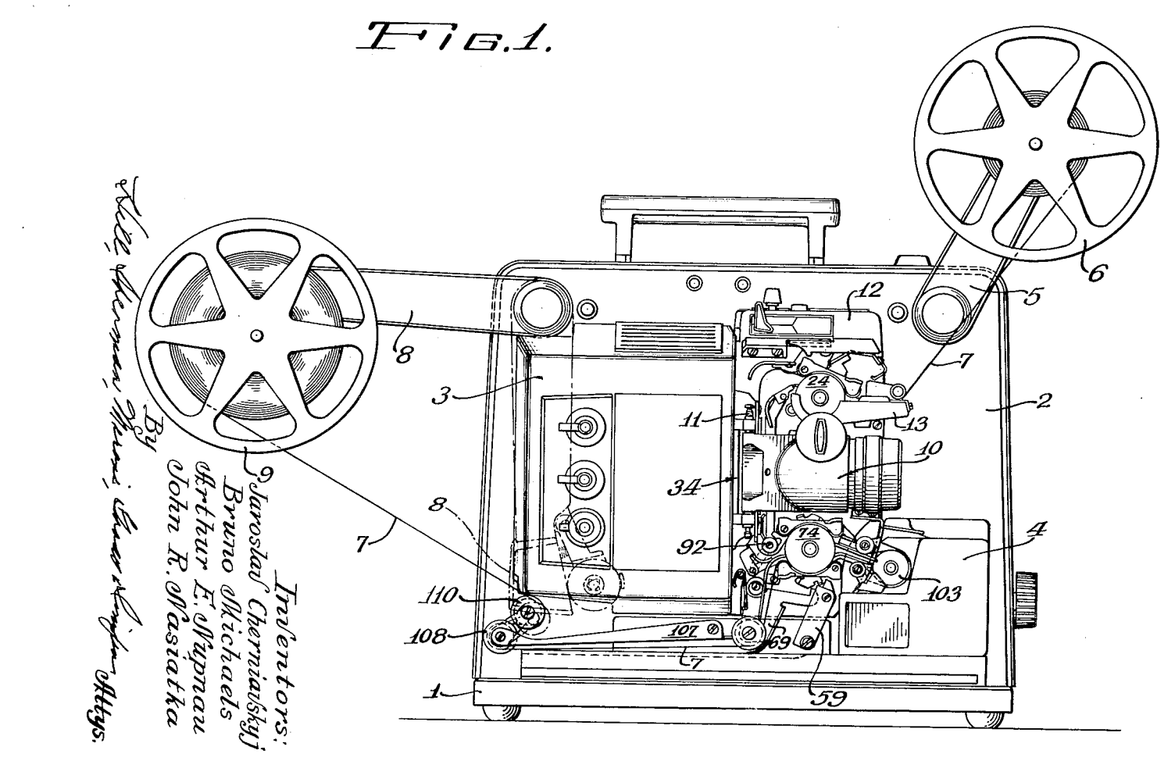
FIGURE 1 is a side elevational view of a motion picture projector embodying principles of the instant invention, showing the same with the cover removed and in position for normal running operation.

With reference to FIGURE 1, it will be seen that the projector in general comprises a base 1 having an upstanding frame plate 2 thereon which supports the major portion of the projector mechanism. The usual control switching mechanism and illuminating means are contained within a housing 3 carried by the frame plate. A known type of sound mechanism is at least partially enclosed within a housing 4 on the frame plate. An arm 5 is pivoted to the forward part of the plate 2 and carries a film supply reel 6 for a film 7. At the rear of the projector, another arm 8 is pivoted and movable between a storage position indicated by dotted lines and an operating position indicated by full lines, this arm supporting a film take-up reel 9. Means for operating the reels are contained within the arm in a known manner, the main drive means, sound reproducing means, and the like carried in the main on the rear side of the plate not being shown in the drawings. The usual lens mount 10 is provided, and pivoted as at 11 to a housing 12 carried by the frame plate 2, and the housing 12 supports the major portion of the mechanism embodied in the instant invention.

It will be understood that the mounting of pivots, provision of bearing means, securement of fixed parts to the supporting structure, and the like may all be accomplished in a known manner, and will not be specifically described herein.

Figure 2:
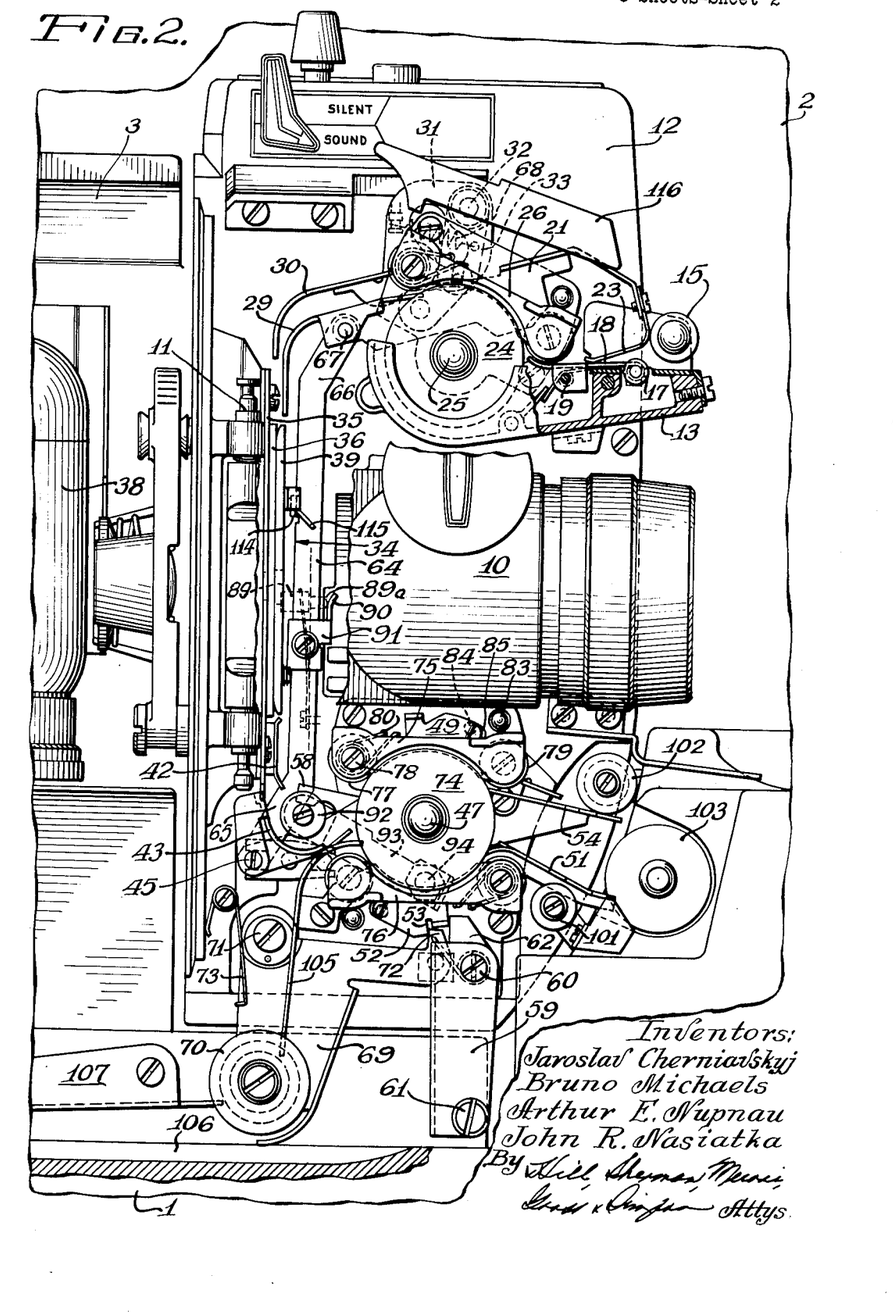
FIGURE 2 is an enlarged fragmentary side elevational view of the film guiding, feeding, and threading mechanism seen in the right central portion of FIGURE 1, showing the same in self-threading position.

The lever and linkage system by means of which the mechanism is switched back and forth between normal running position and film threading position, as well as the guide and loop forming means are more specifically disclosed, described and claimed in the aforesaid copending application Serial No. 783,248, now Patent No. 3,122,965. These parts, therefore, will be more briefly described in the instant application. With reference now to FIGURES 2, 3, 4 and 5, it will be seen that this structure, mentioned for convenience in the direction of film travel through the projector, in general embodies a fixed entrance guide 13 on which an angular bracket 14 forming a film track is mounted, and spaced slightly above the track on the upright portion of the bracket is a film guide roller 15. The bracket is provided with an opening 16 in the horizontal portion thereof to accommodate a roller 17 carried on the outward end of a blocking plate 18 pivoted as at 19 to a part of the entrance guide 13 and which is spring biased as indicated at 20 to the position seen in FIGURE 3 when there is no film in the projector. In this position, the blocking plate effectively prevents entrance of film into the projector until the mechanism is switched to film threading position. A rigid lever 21 is pivoted on the housing frame 12 as indicated at 22 and on the outer end thereof this lever carries an underturned flat spring finger 23 which contacts the blocking plate 18 when the lever is moved to film threading position and holds the blocking plate down to permit entrance of film as seen in FIGURE 2.

Figure 3:
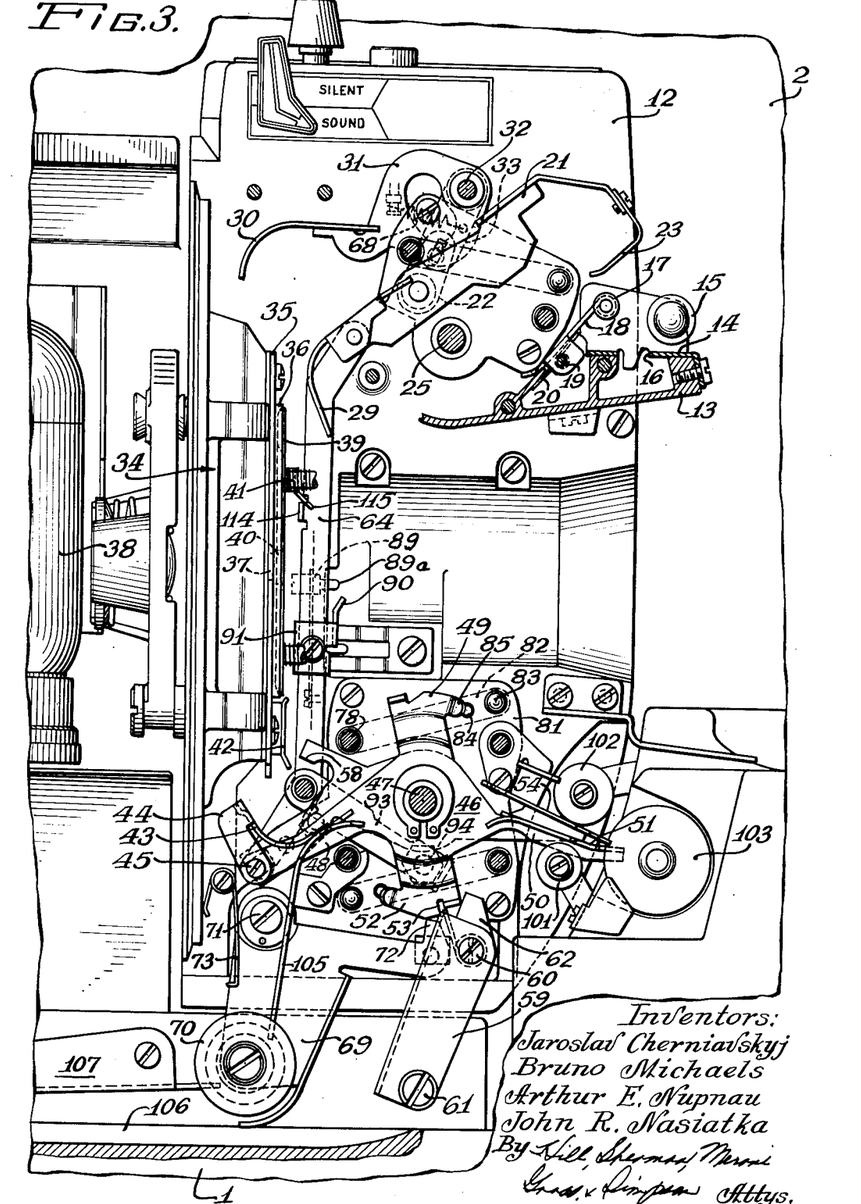
FIGURE 3 is a fragmentary vertical sectional view, with parts omitted, taken just to the rear of the structure shown in FIGURE 1, and showing the mechanism in normal running position.

In front of the lever 21 is a drive sprocket 24 mounted on a shaft 25. A resiliently biased guide shoe 26 is associated with the sprocket and carries a guide roll 27 at one end and another guide roll 28 at the other end. This guide shoe forces incoming film into contact with the sprocket insuring quick and accurate meshing of the sprocket teeth and film apertures. Since there are other guide shoes associated with the lower sprocket, and all are alike one will be more specifically described later herein.

On the inner end of the aforesaid lever 21 is an inner guide 29 downwardly curved to guide film toward the gate assembly. Associated with the inner guide 29 is an outer downwardly curved guide and loop former 30 which is carried by a plate 31 pivoted as at 32 to a link 33 in turn connected to rotate with the pivot pin 22 of the fixed lever 21, so that when the lever 21 is pivoted from the open position of FIGURE 3 to the film threaded position of FIGURE 2, the link 33 is forced upwardly and the guide 30 brought into close association with the guide 29.

Beneath the loop forming guides 29 and 30 is a gate assembly, generally indicated by numeral 34, which is of known construction. This gate assembly embodies a rear plate 35 having opposed side guides 36 thereon to define a film track, and which is provided with an opening 37 through which light from a bulb 38 may pass, all as seen best in FIGURE 3. The back plate 35 is also provided with an elongated slot adjacent the aperture 37 through which the teeth of a feed shuttle to be later described may extend to engage the film apertures. The gate assembly also includes an aperture or pressure plate 39 having an aperture 40 therein, which plate is carried by the aforesaid lens mount 10 and spring biased as indicated at 41 toward the track plate 35.

Figures 5, 6:
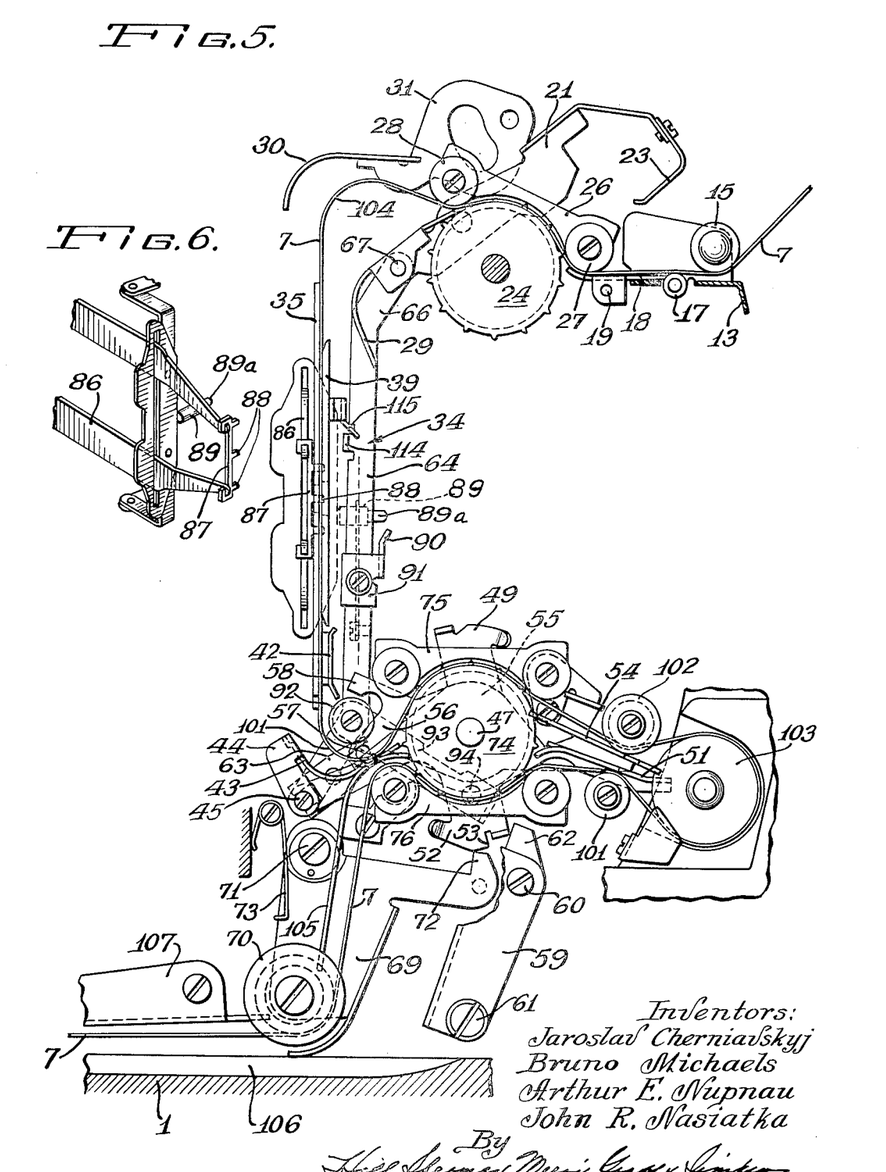
FIGURE 5 is a view similar in character to FIGURE 4, but illustrating the structure and travel of the film in normal running position.
FIGURE 6 is a fragmentary perspective view of the film feed shuttle and its carrying mechanism.
Figure 7:
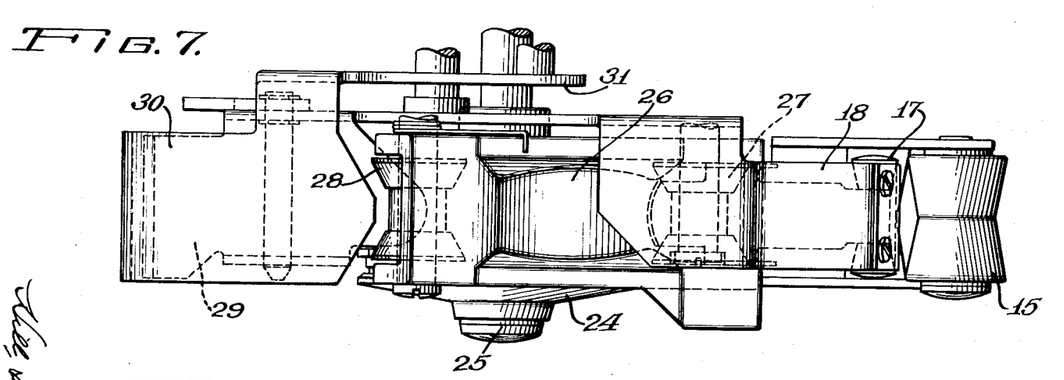
FIGURE 7 is an enlarged fragmentary view showing a top plan view of the film feeding and guiding mechanism above the gate assembly.
Figure 8:
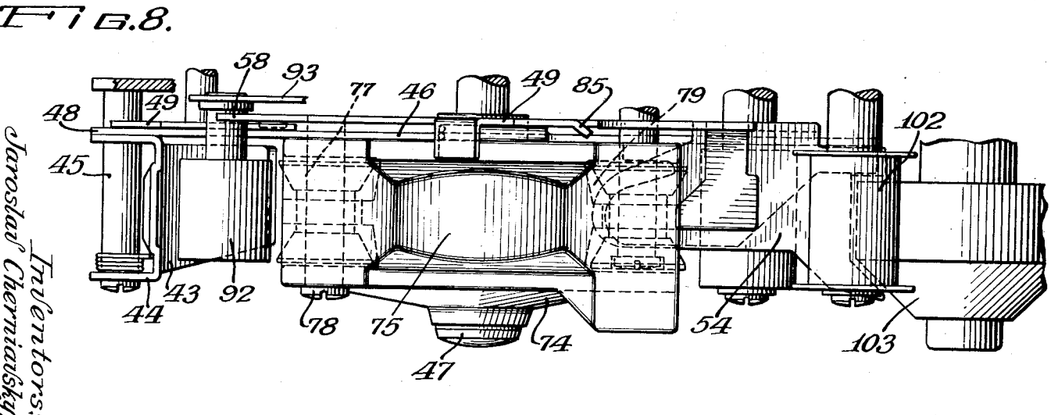
FIGURE 8 is a fragmentary view giving a top plan view of the film feeding and guiding mechanism below the gate assembly.

On the lower end of the track plate 35 is a fixed guide 42 which directs the descending film toward a lower loop former 43, best seen in FIGURE 5, carried on a link 44 the lower end of which is connected to a pivot pin 45. With reference now to FIGURE 3, it will be seen that there is a four-armed plate 46 which is centrally pivotal about a shaft 47. One arm 48 of this plate is pivotally connected to the aforesaid pin 45. Another arm 49 triggers a sprocket guide shoe which may have been left in open position, in a manner that will later be described. A third arm 50 carries a laterally extending threader plate 51. The fourth arm 52 also functions as a trigger for an open sprocket guide shoe, but as seen best in FIGURE 5, this arm also carries a latch formation 53. An elongated lever 55 disposed behind the four-armed plate 46 and pivoted about the same shaft 47 carries an upper horizontally extending spreader plate 54 at its outer end. At the inner end thereof this lever 55 carries a downwardly extending projection 56 having a pivot pin 57 in the lower end thereof. An outward projection 58 ultimately moves a loop restorer into film threading position.

An actuating lever 59 disposed below the mechanism above described is pivoted to the housing frame 12 as indicated at 60 and is provided with an outwardly extending handle 61 for manipulation of the lever. This lever on its inner end carries a pusher formation 62 which bears against the lower arm 52 of the plate 46 as seen in FIGURES 3 and 5. When this arm is straightened by swinging it counterclockwise it moves the four-armed plate 46 in a clockwise direction thereby elevating the pivot pin 45 and dropping the spreader plate 51 to the open position of FIGURE 2. At the same time, by way of a link 63 between the pivot pin 45 and the pin 57 on the lever 55, that lever 55 is turned counterclockwise and the spreader plate 54 is moved to the open position of FIGURE 2. At the same time, the upper linkages and levers carrying the guiding and loop forming members 29 and 30 are moved to film threading position from the running position of FIGURE 5 by means of an elongated link 64 having an obliquely disposed lower end portion 65 pivoted to the pin 45, and an obliquely extending upper end 66 pivoted as at 67 to the lever 21 adjacent the guide 29. Consequently when the actuator lever 59 is moved counterclockwise, the elongated link 64 is forced upwardly thereby pivoting the lever 21 clockwise and causing a rotation of the aforesaid shaft 32 counterclockwise to lower the guide and loop former 30 from running position of FIGURE 5 to the film feeding position of FIGURE 4. The connection between the lever 21 and the shaft 32 is behind the housing frame 12 and is more fully disclosed and described in the aforesaid copending application Serial No. 783,248, now Patent No. 3,122,965. The entire toggle linkage system and parts actuated thereby are spring biased to normal running position by means of a spring 68 in the upper portion of FIGURES 2 and 3, and by way of other springs at judicious locations should they be deemed necessary.

The mechanism is latched in film threading position by way of a guide bracket 69 adjacent the base of the projector, and which carries a film guide roll 70 thereon and is pivoted to the housing frame 12 by a pin 71. This bracket carries a projecting hook 72 for engagement with the latch formation 53 on the arm 52 of the plates contacted by the pusher 62 on the actuator as seen best in FIGURES 4 and 5. A spring 73 biases a bracket 69 toward latching position. Consequently, when the control lever 59 is moved counterclockwise from the position of FIGURE 5 to that of FIGURE 4 latching between the hooks 72 and the latch formation 53 occurs and the entire mechanism is held in film threading position. Slight pressure upon the bracket 69, which may be accomplished by a light tug upon the film riding the guide roll 70, or by manually with a tap of the finger, releases the latching engagement and permits the mechanism to immediately shift to normal running position.

Lower film drive is effected by way of a drive sprocket 74 mounted on the aforesaid shaft 47. This sprocket is equipped with an upper sprocket guide shoe 75 and a lower or under sprocket guide shoe 76, these guide shoes being identical with the guide shoe arrangement 26 for the upper drive sprocket 24. Since the guide shoe arrangements are identical, that associated with the guide shoe 75 only will be described with reference to FIGURES 2 and 3 of the drawings.

At one end of the guide shoe 75 there is a film guide roller 77 mounted on a shaft 78, and a guide roll 79 is similarly mounted at the other end of the shoe. The shoe is of channel shape and is pivotal about the shaft 78, but is spring biased toward the sprocket drum 74 by means of a spring 80. On the rear side of a plate 81 carrying the guide shoe assembly is a leaf spring 82 having one end anchored on the shaft 78 and which has a detent 83 on the other end extending through an aperture in the plate. Also on this leaf spring is a small button 84 similarly extending through an aperture in the plate 81. An upwardly inclined end portion 85 on the arm 49 of the four-armed plate 46 is disposed adjacent the button 84 when the mechanism is in normal running position and the guide shoe is, of course, in close association with the sprocket drum. In the event the guide shoe has been elevated so that an overhanging portion of it is locked and retained by the detent 83, for the purpose of hand threading or any other reason, and inadvertently left in that position, it will be immediately restored to operating position by movement of the actuating lever 59 to set the mechanism in film threading position. When the actuating lever is moved the arm 49 carrying the upwardly bent end 85 passes over the button 84 and forces the leaf spring 82 rearwardly withdrawing the detent 83 from engagement with the shoe and permitting the spring 80 to again force the shoe into close association with the sprocket drum. In case the film jams, the spring 80 permits the guide shoe to yield to film pressure sufficiently to prevent the sprocket teeth damaging the film.

To intermittently advance film through the gate assembly 34, a shuttle assembly is utilized. As seen in FIGURES 5 and 6, this assembly includes a shuttle frame 86 carrying on the free end thereof a shuttle 87 having teeth 88 thereon for engagement in the film apertures. The shuttle is driven by means not shown in the drawings, but fully set forth, described and claimed in Stechbart U.S. Letters Patent No. 2,489,829 issued November 29, 1949. The shuttle has substantially a rectangular motion, that is it moves forwardly into the gate assembly and into engagement with the film apertures at the upper end of its stroke, then downwardly carrying with it the film, then rearwardly out of the gate passage, and upwardly still outside the gate passage. The shuttle moves in the reverse direction upon reversing the direction of film travel.

During a film threading operation, the shuttle does not cease operating. Heretofore it was virtually impossible to provide a satisfactorily operating machine that was self-threading insofar as 16 mm. film was concerned because of the injury done that film by the moving shuttle teeth during the threading operation through the gate assembly. Such prospect of film damage is entirely overcome in the instant invention with the provision of simple means for holding the shuttle retracted from the film path through the gate assembly during the threading operation. With reference more particularly to FIGURES 5 and 6, it will be seen that a pin 89 having a reduced projecting end 89a is free to ride in a complementally shaped passage in the housing 12, in front of the shuttle bridge or frame. The end 89a projects directly into the path of a cam 90 carried by a bracket 91 fixed with the elongated link 64 of the toggle mechanism. When that toggle mechanism is operated to shift the film guiding means into self-threading position, the upward movement of the link 64 causes the cam 90 to push the pin 89 rearwardly against the shuttle frame to the position seen in FIGURE 4 where it will be noted that the shuttle teeth are retracted fully to the rear of the film passage through the gate assembly. As long as the mechanism is adjusted for self-threading, the shuttle is held retracted by the pin, but as soon as the threading operation is completed, and the parts restored to normal running position as seen in FIGURE 5, the shuttle pushes the pin 89 outwardly and again enters the film path through the gate assembly.

There is no accurate way of foretelling that upon re-entry into the film path, the shuttle teeth will properly engage the film apertures. Sometimes they might and other times they may contact the film between apertures and fail to feed it. It is desirable that the shuttle teeth be accurately meshed with the film apertures as quickly as possible, and to this end a lower loop restorer cooperates with the shuttle teeth with the film. This loop restorer is positioned at the lower end of the gate assembly and is in the form of a roller 92 carried on the end of an arm 93 disposed behind the lever 55 carrying the aforesaid pusher extension 58, and the other end of the lever is connected to rotate with a shaft 94 extending through the housing frame 12.

Figure 9:
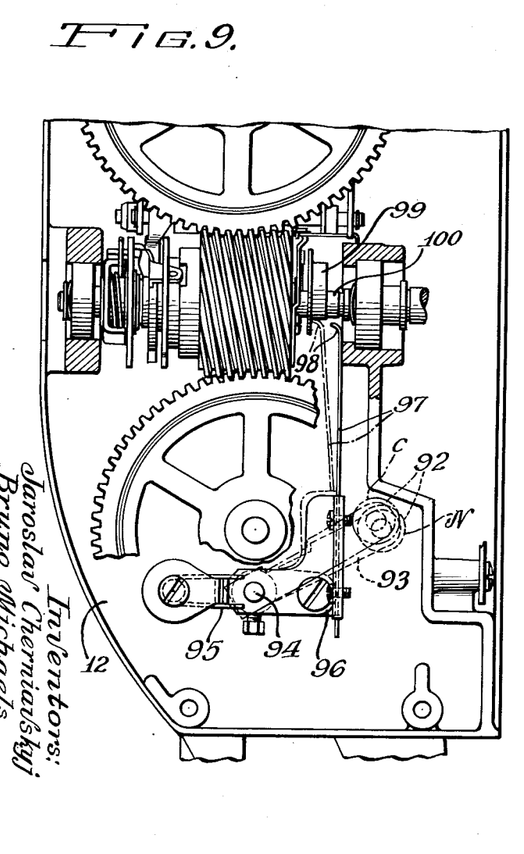
FIGURE 9 is a fragmentary rear elevational view, with parts in section, illustrating the drive means for the loop restorer.
Figure 10:
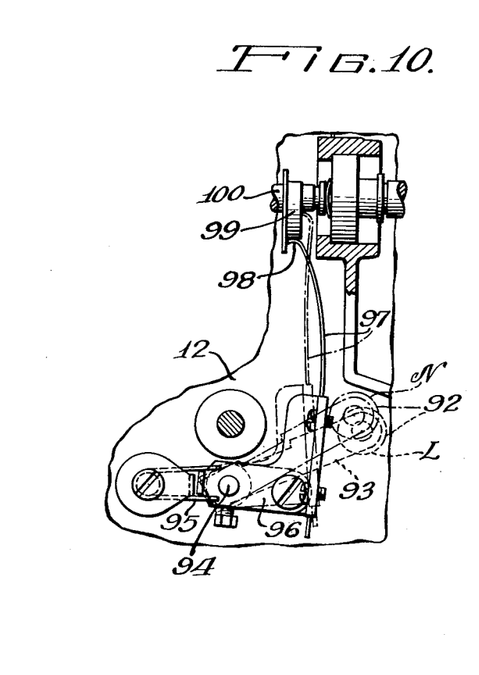
FIGURE 10 is a fragmentary view of the right-hand portion of FIGURE 9 illustrating the drive means in a different position of operation.

Mechanism for operating the film restorer 92 by oscillating the same about the shaft 94 is provided on the rear side of the housing frame 12 as somewhat diagrammatically illustrated in FIGURES 9 and 10. This actuating mechanism is more fully disclosed, described and claimed in a previously issued Michaels U.S. Letters Patent No. 3,021,039 dated February 13, 1962. Accordingly, herein, it will be sufficient to briefly point out that the mechanism embodies spring means 95 which tend to maintain the arm 93 in normal running positions indicated by the dotted line showing N in FIGURES 9 and 10. This spring is associated with the inner end of an upstanding L-shaped bracket 96 secured to the shaft 94. A straight leaf spring 97 extends upwardly from the bracket 96 and has a turned upper end 98 to ride an eccentric cam 99 on a drive shaft 100. When the mechanism is in normal running position, the spring will be in the full line position of FIGURE 9.

Figure 4:
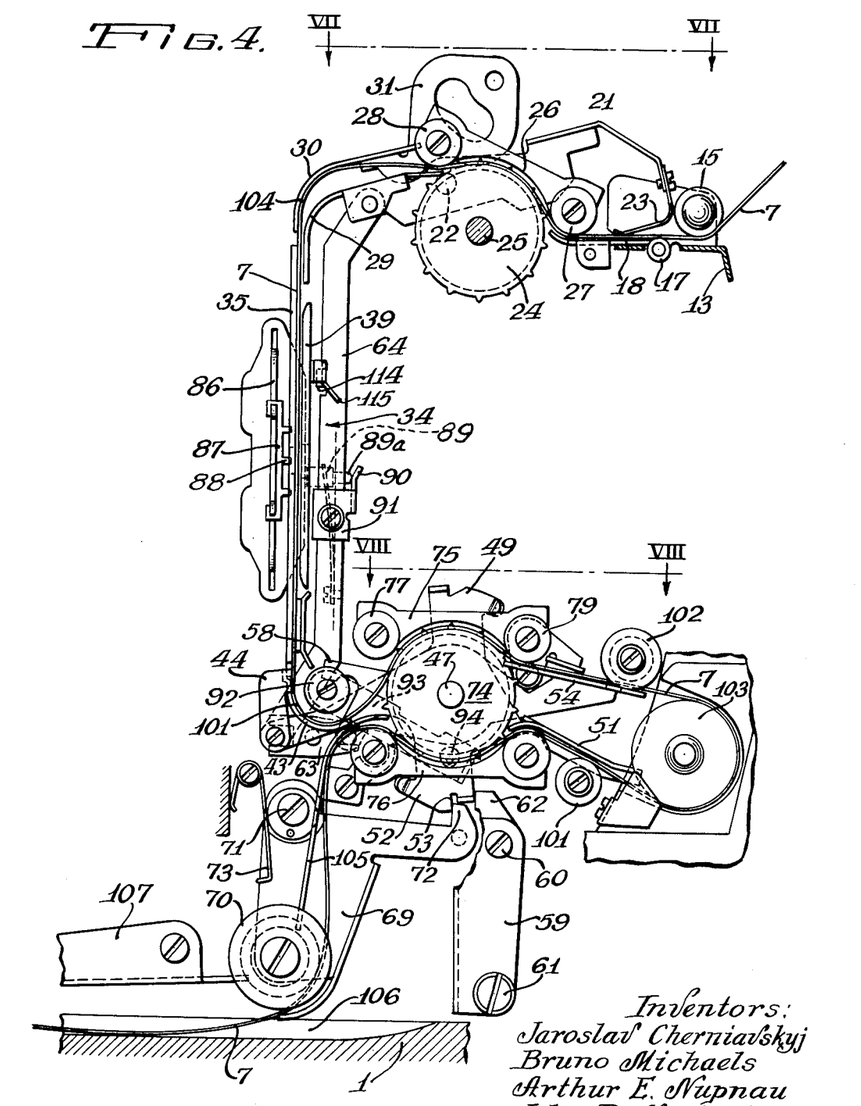
FIGURE 4 is a fragmentary part-sectional part-elevational view of the self-threading and film feeding mechanism of FIGURE 2, somewhat diagrammatically shown and indicating the path of the film therethrough, with the mechanism again in film threading position.

If, when the mechanism is restored from threading position to normal running position, the shuttle teeth do not engage the apertures of the film upon their return to the film path through the gate assembly, the lower loop 101 of the film seen in FIGURE 4 will be lost and the film will ride against the restorer roll 92 and move the same to the upper dotted line position of FIGURE 9, designated C, which moves the end 98 of the spring to the dotted line position where it may be in contact with the cam 99. In the event the high side of the cam is uppermost as seen in this figure, contact will be made with the cam immediately, but in the event the high side of the cam is downward, contact will be made upon a half revolution of the shaft 100. With contact with the cam so established, a half rotation of the shaft 100 will cause the cam to force the spring 97 downwardly to the full line position of 110, moving the restoring roll 92 very quickly and forcefully to the loop forming position designated L in FIGURE 10. This oscillation of the loop forming roll 92 proceeds very rapidly until the loop 101 in the film is again established.

It should be especially noted, however, that only one or two downward movements of the restorer 92 are sufficient to properly mesh the film apertures and shuttle teeth. The loop, of course, will be restored should it become lost at any time during normal running operation in the same manner.

The operation of the instant invention is rapid and precise, and affords a maximum amount of simplicity for the attendant. As will be seen in FIGURE 3, when there is no film in the projector and the mechanism is adjusted to normal running position, it is impossible to enter any film into the projector because of the blocking gate 18 extending entirely across the film entrance way. When it is desired to thread film into the projector, it is a simple expedient for the operator to move the control lever 59 counterclockwise until the hook 72 engages the latch 53, and the parts are locked in film threading position as seen in FIGURE 2. This simple movement of the control lever 59 causes the finger 23 to hold down the blocking gate 18, brings the upper guides and loop formers 29–30 into close proximity with each other, retracts the shuttle teeth entirely out the film path through the gate assembly, retracts the pressure outwardly away from the track plate, moves the lower loop former 43 upwardly to a position immediately adjacent the lower end of the gate, and causes the projection 58 on the lever 55 to engage the shaft of the loop restoring roll 92 and force that roll downwardly into closer proximity with the loop former 43. At the same time, should any of the guiding shoes associated with the driving sprockets 24 and 74 have inadvertently been left in open position, they will be immediately released for proper guiding association with the sprockets. Also, the spreader plates 51 and 54 are spread widely apart, as seen best in FIGURES 2 and 4, against the action of spring biased film guiding rollers 101 and 102, respectively, to insure proper guidance of the film over and around a sound drum 103.

With the parts adjusted in self-threading position, and with reference more particularly to FIGURE 4, the film 7 enters over the entrance guide 13 and between the roll 17 on the blocking gate 18 and the spring finger 23, passing beneath the guide roll 27 inside a guide shoe 26 where the guide shoe causes immediate and proper engagement of the film apertures over the teeth of the sprocket 24, beneath the guide roll 28 on the other side of the sprocket and against the inside face of the guide loop former 30 whereupon an upper loop 104 is established in the film. Thereafter the film descends freely through the gate assembly, the shuttle having been retracted, and engages the lower guide and loop former 43 to provide the aforesaid lower loop 101, after which the film passes upwardly and is engaged with the sprocket teeth 74 with the aid of the sprocket guide shoe 75, passes over the upper spreader plate 54 beneath the guide roll 102 over and around the sound drum 103, over the guide roll 101, and into meshed engagement with the underside of the sprocket 74 aided by the lower guide shoe 76 into contact with a fixed guide plate 105, downwardly and around the guide roll 70 on the bracket 69. This movement of the film is one rapid fluent motion. The free end of the film then enters and passes along a film track 106 formed in a portion of the base 1, as seen best in FIGURES 11, 12 and 13.

Disposed over the track 106 is a fixed elongated guide member 107 carrying a guide roller 108 floating on a cross shaft 109 at the far end of the fixed guide 107. A snubbing roll 110 having an actuating handle 111 thereon is carried on the free end of an arm 112 having its other end pivotally associated with the shaft 109 and biased to upward position as seen in FIGURE 13 by a spring 113.

Figure 11:
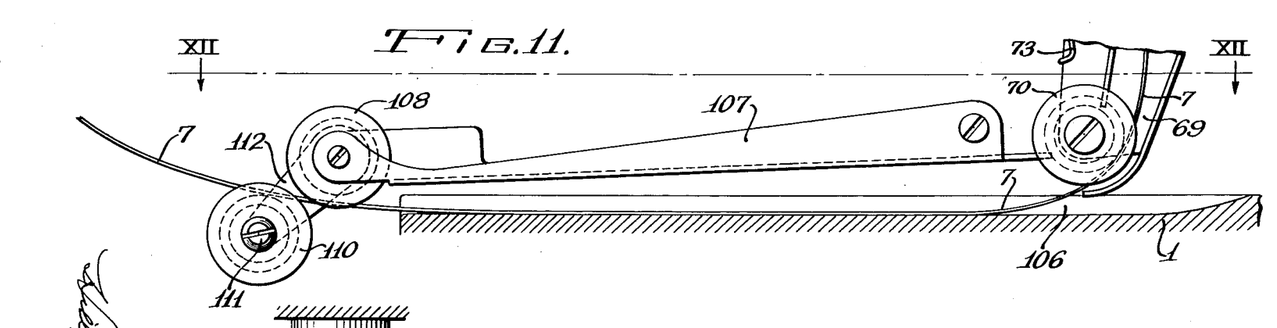
FIGURE 11 is an enlarged fragmentary side elevational view of the lower portion of the structure of FIGURE 1, indicating the film track beneath the machine leading past the snubbing roll, with the snubbing roll in film threading position.
Figures 12, 13:
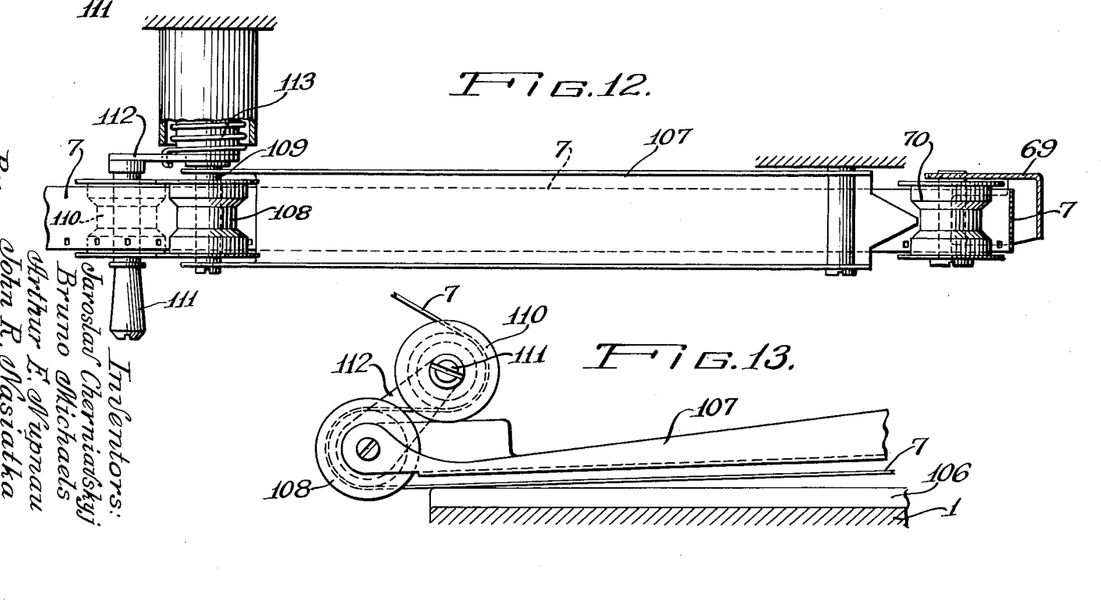
FIGURE 12 is a fragmentary plan sectional view taken substantially as indicated by the line XII—XII of FIGURE 11, looking in the direction of the arrows.
FIGURE 13 is a fragmentary view similar in character to FIGURE 11, but showing the snubbing roll in normal running position.

As the free end of the film 7 passes along the track 106 during the threading operation, it is simply necessary for the operator to grasp the handle on the snubbing roll and moves that roll to the downward position seen in FIGURES 11 and 12 and permit the film 7 to pass in practically a straight line between the rolls 108 and 110, after which the snubbing roll may be permitted to assume its normal or upper position as seen in FIGURE 13 with the film following a switch back path between the two rolls 108 and 110. The end of the film may then be engaged with the take-up reel 9.

It is to be particularly noted that contemporaneously with the retraction of the shuttle upon the upward movement of the link 64, that same link causes retraction of the pressure plate 39 outwardly from the position of FIGURE 5 to the position of FIGURE 4. This is accomplished by a projection 114 on the link 64 riding against a sloping cam bracket 115 on the pressure plate 39 and thereby urging the pressure plate outwardly against the action of the springs 41. Thus the film path through the gate assembly is completely unimpeded during threading of the film and there is no danger of the film jamming or becoming damaged because of pressure thereon.

The threading operation requires only a few seconds and the projector is then ready for operation, the mechanism being readily restored to normal running position by a slight pull on the film or a touch of the finger to pivot the bracket 69 and release the latching engagement between the hook 72 and the latch 53. This will cause the parts to immediately be snapped into running position. The various parts then assume the position seen in FIGURE 5 with the resilient finger 23 elevated and the blocking gate 18 held down by the film itself. The upper guides 29 and 30 are spread apart but the formed top loop 104 remains in the film. The shuttle teeth 88 have again entered the film path through the gate assembly and if not immediately meshed with the film will almost instantaneously become meshed by the action of the loop restorer 92 as above described and at the same time the lower loop 101 in the film will be restored if it is not of proper size. The pressure plate again holds the film for engagement by the shuttle teeth. The spreader plates 51 and 54 will have moved toward each other with the film riding the inside of the guide rolls 101 and 102 over the outer faces of the spreader plates to cause more than 180° surface contact of the film with the sound drum 103, and since the film is being drawn along by the take-up reel 9 it will not contact the bottom of the tracks 106 but will be elevated thereabove as seen clearly in FIGURE 5.

If, for any reason, manual threading of the film appears desirable, that may be accomplished in the usual manner after opening the gate by pivoting outwardly the lens mount 10, moving the three guide shoes away from the sprocket drums, and the film may be slipped in between the finger 23 and the roller 17 on the blocking plate 18.

From the showing in FIGURE 1, it will be noted that when the arm 8 is in storage position, the end of the arm overlies the snubbing roll 110 and movement of that roll to permit the threading of the film is not possible until the arm 8 has been moved to a position capable of supporting a take-up reel.

If, by virtue of previous damage to a film, loops are lost when such film is fed through the projector in the reverse direction, the loops may be restored by pressing downwardly on a hand lever 116 seen in FIGURE 2. This hand lever bears against the aforesaid lever 21 and moves the mechanism to self-threading position without latching engagement between the hook 72 and latch 53, and the mechanism is immediately restored to normal running condition when pressure on the lever 116 is released. This lever may also be utilized to restore film tension over the sound drum 103, if such tension is lacking after a film threading operation.

From the foregoing, it will be apparent that we have provided a rapid, precise, and easily operable self-threading motion picture projector capable of handling 16 mm. film as well as film of other sizes without danger of injury to the film. It should also be especially noted that the instant invention by way of operation of the loop restorer 92 will effectively thread film that has been previously mutilated to some extent, and even to the extent of having the apertured margin thereof ripped between apertures for a comparatively great distance.

It will b understood that modifications and variations may be effected without departing from the scope of the novel concepts of the present invention.

We claim as our invention:
1. In a self-threading motion picture projector,
a gate assembly,
a toothed shuttle for intermittently advancing film through the gate assembly,
means to advance film continuously toward one end of said gate assembly,
means to advance film continuously away from the other end of said gate assembly,
loop forming means adjacent each end of said gate assembly,
means cooperating with said loop forming means to switch the same between a self-threading position and running position, and
shuttle retracting and holding means actuated by movement of said last named means to its self-threading position to maintain the shuttle teeth out of said gate assembly while said loop forming means are in self-threading position.

2. In a self-threading motion picture projector,
a gate assembly,
a toothed shuttle for intermittently advancing the film through the gate assembly,
means to advance film continuously toward one end of said gate assembly,
means to advance film continuously away from the other end of said gate assembly,
loop forming means adjacent each end of said gate assembly,
toggle linkage means cooperating with said loop forming means to switch the same from running position to self-threading position, and
shuttle retracting means responsive to movement of said toggle linkage means to its self-threading position to hold the shuttle teeth out of said gate assembly during self-threading.

3. In a self-threading projector for film having a series of apertures along a margin thereof,
feeding means to advance film along a predetermined path,
a gate assembly in the film path,
a toothed shuttle to advance film through said gate assembly,
film guiding and loop forming mechanism adjacent each end of said gate assembly movable into and out of automatic film threading position, and
shuttle retracting means to hold said shuttle with its teeth out of said gate assembly actuated by the movement of said mechanism to its film threading position.

4. In a self-threading projector for film having a series of apertures along a margin thereof,
feeding means to advance film along a predetermined path,
a gate assembly in the film path,
a toothed shuttle to advance film through said gate assembly,
film guiding and loop forming mechanism adjacent each end of said gate assembly movable into and out of automatic film threading position,
a toggle linkage system to move said mechanism, and
means carried by said linkage system to retract and hold the shuttle with its teeth out of the film path when the linkage is operated to move said mechanism to film threading position.

5. In a self-threading motion picture projector,
self-threading mechanism movable between self-threading position and normal running position,
a gate assembly through which film travels,
toothed shuttle means to advance film through said gate assembly,
actuating means for said mechanism,
a pin adjacent said shuttle means extending outward beyond said gate assembly, and
means carried by said actuating means to contact said pin and move the same against the shuttle means to retract said shuttle means out of the film path when the actuating means is operated to move said mechanism to self-threading position.

6. In a self-threading motion picture projector,
means defining a predetermined path for film travel including guide and loop forming means shiftable between normal running and film threading positions,
spaced drive sprockets to continuously advance film along said path,
toothed means to intermittently advance film between said sprockets,
actuating means for shifting said guide and loop forming means, and
means responsive to operation of said actuating means to retract said toothed means from the film path when said guide and loop forming means are shifted to their film threading position.

7. In a self-threading motion picture projector,
means defining a predetermined path for film travel including guide and loop forming means shiftable between normal running and film threading positions,
spaced drive sprockets to continuously advance film along said path,
toothed means to intermittently advance film between said sprockets,
actuating means for shifting said guide and loop forming means,
means responsive to operation of said actuating means to retract said toothed means from the film path when said guide and loop forming means are shifted to their film threading position,
and a loop restorer automatically actuated by a shortened film loop to advance film intermittently until said toothed means mesh with film apertures in the event meshing does not take place when said toothed means return to the film path for normal running operation.

8. In a self-threading motion picture projector,
upper and lower drive sprockets,
upper and lower film guiding assemblies adjacent said sprockets shiftable between normal running and film threading positions,
a link connecting said assemblies to insure joint operation thereof,
actuating means for moving said link to shift said guiding assemblies between normal running and film threading positions,
a gate assembly between said guiding assemblies,
a toothed shuttle assembly to feed film through said gate assembly,
a reciprocable pin in front of said shuttle assembly, and
a bracket on said link to contact said pin and push it against said shuttle assembly to retract the same out of the film path through said gate assembly when said guiding assemblies are shifted to film threading position by said actuating means.

9. In a motion picture projector,
a base,
frame means thereon,
film feeding, threading and guiding means on said frame means to advance film through the projector,
a film track along said base,
a fixed elongated guide above said track,
a guide roll at the rear end of said fixed guide,
a snubbing roll pivotal away from snubbing position to permit film to thread between the guide and snubbing rolls,
an arm pivoted to said frame means and movable to reel carrying position and storage position adjacent said frame means, and,
said arm directly overlying snubbing roll and blocking pivotal movement thereof until said arm has been moved out of storage position.

10. In a self-threading motion picture projector,
frame means,
film feeding and guiding means on said frame means to move a film along a predetermined path, said film feeding and guiding means being movable between a normal running and a self-threading position,
a gate assembly forming a part of said path,
toothed shuttle means to feed film through said gate assembly,
means to retract and hold said shuttle means out of said gate assembly while said film feeding and guiding means is in self-threading position to permit automatic threading of film therethrough, and
an oscillatable loop former adjacent the exist end of said gate assembly and actuated by a shortened film loop to quickly advance the film in short increments to insure proper engagement between the film and shuttle means if such engagement is not established upon return of the shuttle means after retraction.

11. In a self-threading motion picture projector,
a gate assembly comprising
    a track plate and
        a pressure plate spring biased toward said track plate,
a toothed shuttle for intermittently advancing film through the gate assembly,
film advancing means on each side of said gate assembly,
self-threading mechanism movable between self-threading position and normal running position, and
means responsive to movement of said mechanism to self-threading position to retract and hold said shuttle with its teeth out of said gate assembly, and to move and hold said pressure plate away from said track plate.

12. In a self-threading motion picture projector,
film advancing means,
film guide means movable between self-threading position and normal running position,
a manually operable linkage for moving said film guide means to self-threading position,
a gate assembly forming a part of the path of travel of film through the projector and including
 a track plate and
 a pressure plate spring biased toward the track plate, and
retarding means to hold the pressure plate away from the track plate during a self-threading operation,
a toothed shuttle to move the film through the gate assembly, and
retracting means to hold said shuttle with its teeth out of said gate assembly during a self-threading operation.

13. In a self-threading motion picture projector,
film advancing means operable in both forward and reverse directions,
film guiding and loop forming mechanism movable between self-threading position and normal running position,
latching means to hold said mechanism in self-threading position, and
a hand operable resiliently biased lever for momentarily moving said mechanism toward self-threading position but short of rendering said latching means effective, said lever permitting said mechanism to restore a lost film loop when film is moving in the reverse direction through the projector with the film guiding and loop forming mechanism in normal running position.

14. In a self-threading motion picture projector,
means defining a predetermined path for film travel including guide and loop forming means shiftable between normal running and film threading positions,
spaced drive sprockets to continuously advance film along said path,
toothed means to intermittently advance film between said sprockets,
actuating means for shifting said guide and loop forming means,
means responsive to operation of said actuating means to retract said toothed means from the film path when said guide and loop forming means are in film threading position,
a guide shoe associated with at least one of said sprockets and pivotal relative to the sprocket about an axis parallel to the axis of the sprocket, and
resilient means biasing said guide shoe into operative association with the sprocket, said resilient means biasing the said guide shoe sufficiently lightly to permit raising of the guide shoe by the film.

15. In a self-threading motion picture projector,
film advancing means,
means defining a predetermined path for film travel including guide and loop forming means shiftable between normal running and film threading positions,
a manually operable linkage for moving said guide and loop forming means to self-threading position,
a gate assembly forming a part of the path of travel of film through the projector and including
 a track plate and
a toothed shuttle to move the film through the gate assembly, and
retracting means to hold said shuttle with its teeth out of said gate assembly during a self-threading operation.

16. In a self-threading motion picture projector,
a gate assembly through which film travels,
means to advance film toward one end of said gate assembly,
self-threading mechanism movable between self-threading position and normal running position,
said self-threading mechanism including loop forming means positioned between said means to advance and said gate assembly,
a toothed shuttle to advance film through said gate assembly, and
means to hold said shuttle retracted with its teeth out of said gate assembly when the self-threading mechanism is in self-threading position, said last named means being actuated by the movement of the self-threading mechanism to its self-threading position.

References Cited by the Examiner
UNITED STATES PATENTS

| | | | |
|---|---|---|---|
| 1,840,353 | 1/32 | Fear | 226—56 |
| 2,203,655 | 6/40 | Lechleitner et al. | 88—17 |
| 2,420,587 | 5/47 | Dietrich | 226—91 |
| 3,021,039 | 2/62 | Michaels | 226—36 |
| 3,029,686 | 4/62 | Bernzott | 226—91 X |
| 3,063,610 | 11/62 | Briskin et al. | 226—91 |
| 3,065,890 | 11/62 | Fox | 226—36 |

ROBERT B. REEVES, *Primary Examiner.*

RAPHAEL M. LUPO, *Examiner.*